US012602458B2

(12) United States Patent (10) Patent No.: US 12,602,458 B2

Tsukada (45) Date of Patent: Apr. 14, 2026

(54) ACCESS MANAGEMENT AND CONTROL OF A DISPLAY UNIT MENU OPTIONS

(71) Applicant: CANON KABUSHIKI KAISHA, Tokyo (JP)

(72) Inventor: Nobuyuki Tsukada, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 160 days.

(21) Appl. No.: 18/483,057

(22) Filed: Oct. 9, 2023

(65) Prior Publication Data

US 2024/0134945 A1 Apr. 25, 2024
US 2024/0232303 A9 Jul. 11, 2024

(30) Foreign Application Priority Data

Oct. 25, 2022 (JP) ................................. 2022-170313

(51) Int. Cl.
*G06F 21/31* (2013.01)
*G06F 3/0483* (2013.01)

(52) U.S. Cl.
CPC ............ *G06F 21/31* (2013.01); *G06F 3/0483* (2013.01); *G06F 2221/2149* (2013.01)

(58) Field of Classification Search
CPC ...... G06F 21/31; G06F 3/0483; G06F 3/0482; G06F 2221/2149
See application file for complete search history.

(56) References Cited

U.S. PATENT DOCUMENTS

| 7,861,934 B1* | 1/2011 | Williams ............... G06Q 30/02 |
| | | 235/462.09 |
| 9,639,247 B2* | 5/2017 | Sugimoto ............. G06F 3/0484 |
| 2005/0195446 A1* | 9/2005 | Kasatani ........... H04N 1/00331 |
| | | 358/402 |
| 2010/0269040 A1 | 10/2010 | Lee |
| 2010/0309507 A1* | 12/2010 | McCann ............... G06F 3/1204 |
| | | 358/1.15 |
| 2011/0107267 A1* | 5/2011 | Ha ........................ G06F 3/0488 |
| | | 715/841 |
| 2011/0265179 A1* | 10/2011 | Newman ............... G06F 21/604 |
| | | 726/22 |
| 2016/0231151 A1* | 8/2016 | Allstrom ............... G01F 15/068 |
| 2021/0200392 A1* | 7/2021 | Abe .................... G06F 3/04817 |

FOREIGN PATENT DOCUMENTS

| JP | 2011028403 A | 2/2011 |
| JP | 2016071680 A | 5/2016 |
| JP | 2020052972 A | 4/2020 |

* cited by examiner

*Primary Examiner* — Mohamed A. Wasel
(74) *Attorney, Agent, or Firm* — Canon U.S.A., Inc. IP Division

(57) ABSTRACT

A control apparatus includes a lock control unit configured to set a menu screen corresponding to at least one tab among a plurality of menu screens respectively corresponding to a plurality of tabs to a locked state in which the menu screen is not displayed, and a setting unit configured to set information for releasing the locked state for each of the menu screens respectively corresponding to the plurality of tabs, wherein the lock control unit sets the menu screen corresponding to a target tab in the unlocked state to the locked state based on the setting unit setting or changing the information for releasing the locked state of the target tab in the unlocked state in which the locked state is released and the menu screen is displayed.

11 Claims, 13 Drawing Sheets

201   202   203   204

| STANDARD | 1 | 2 | 3 |

STANDARD COPY ———305

DOUBLE-SIDED COPY ———306

SAVE DOCUMENT IN PC ———307

ACCESS MANAGEMENT AND CONTROL OF A DISPLAY UNIT MENU OPTIONS

BACKGROUND OF THE INVENTION

Field of the Invention

The present invention relates to a communication apparatus, a control method for the communication apparatus, and a storage medium.

Description of the Related Art

Japanese Patent Application Laid-Open No. 2020-52972 discloses a multifunction peripheral in which a shortcut list screen in tab form is displayed. The above-described multifunction peripheral displays a shared tab in the general mode in which a registered user is not logged in, and displays the shared tab and a personal tab corresponding to the logged in user in the personal mode in which the registered user is logged in. The personal tab is managed so that it can be opened by password authentication or authentication using a card.

However, for example, in a case where a user performs an operation of going back and forth between a plurality of tabs, there may be a case where authentication is performed again on a tab for which authentication has succeeded once, and thus operability may be impaired.

SUMMARY OF THE INVENTION

Therefore, the present disclosure is directed to improving operability of a display screen while ensuring security.

A control apparatus includes a display control unit configured to display, on a display unit, a display screen in tab form including a plurality of tabs and a plurality of menu screens respectively corresponding to the plurality of tabs, and to display, in response to selection of a predetermined tab on the display screen, a display screen including a menu screen corresponding to the predetermined tab on the display unit, a lock control unit configured to set a menu screen corresponding to at least one tab among a plurality of menu screens respectively corresponding to the plurality of tabs to a locked state in which the menu screen is not displayed, and a setting unit configured to set information for releasing the locked state for each of the menu screens respectively corresponding to the plurality of tabs, wherein the lock control unit sets the menu screen corresponding to a target tab in the unlocked state to the locked state based on the setting unit setting or changing the information for releasing the locked state of the target tab in the unlocked state in which the locked state is released and the menu screen is displayed.

Further features of the present invention will become apparent from the following description of exemplary embodiments with reference to the attached drawings.

BRIEF DESCRIPTION OF THE DRAWINGS

FIG. 13 is a flowchart showing a characteristic sequence at the time of power-on.

DESCRIPTION OF THE EMBODIMENTS

Figure 1:
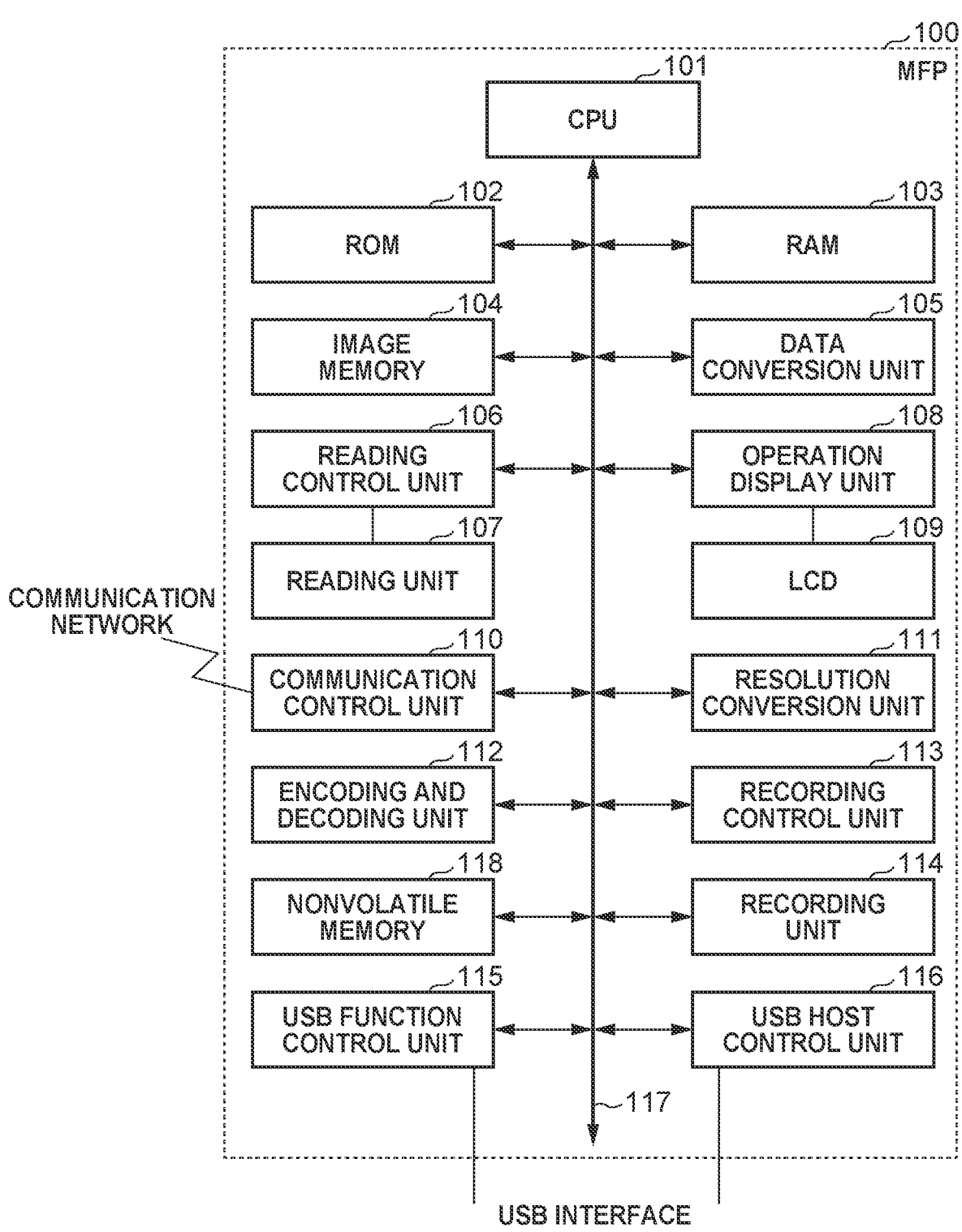
FIG. 1 is a block diagram of a multifunction peripheral (MFP).

Hereinafter, embodiments of the present invention will be described with reference to the drawings. Note that the following embodiments are not intended to limit the present invention, and not all combinations of features described in the embodiments are necessarily essential to solving means of the present invention. In the description, the same components are denoted by the same reference numerals.

<Block Diagram>

FIG. 1 is a block diagram illustrating a schematic configuration example of a multifunction peripheral (MFP) 100 according to a first exemplary embodiment. The MFP 100 is an example of an information processor. The MFP 100 is also an example of an electronic apparatus. The MFP 100 according to the first exemplary embodiment has an information processing function of generating, storing, or transmitting device information including log information and status information. The MFP 100 also has an image forming function of forming an image on a recording medium by a recording control unit 113 and a recording unit 114 (to be described below).

The MFP 100 includes a central processing unit (CPU) 101, a read-only memory (ROM) 102, a random access memory (RAM) 103, an image memory 104, a data conversion unit 105, a reading control unit 106, a reading unit 107, an operation display unit 108, a liquid crystal display (LCD) 109, a communication control unit 110, and a resolution conversion unit 111. The MFP 100 also includes an encoding and decoding unit 112, the recording control unit 113, the recording unit 114, a universal serial bus (USB) function control unit 115, a USB host control unit 116, a bus 117, and a nonvolatile memory 118.

The CPU 101 is a system control unit that controls the entire MFP 100. The ROM 102 is a non-volatile memory for storing fixed data, such as a control program executed by the CPU 101, a data table, and an embedded operating system (OS). In the present exemplary embodiment, each control program stored in the ROM 102 is subjected to software execution control, such as scheduling, task switching, or interrupt processing, under the management of the embedded OS stored in ROM 102. Information about a permission state indicating whether to provide the device information to the outside is stored in the ROM 102. The RAM 103 includes a Static Random Access Memory (SRAM) or the like which requires a backup power supply, and power supply to the RAM 103 is guaranteed by a primary battery (not shown) for data backup. A program control variable and the like are stored in the RAM 103. The image memory 104 is constituted by a Dynamic Random Access Memory (DRAM) or the like, and can accumulate image data. A partial area of the image memory 104 is allocated as a work area for executing software processing. The data conversion unit 105 can perform conversion of image data, such as analysis of a page description language (PDL) or development of character data into computer graphics (CG).

The reading unit 107 optically reads a document with a contact image sensor (CIS) and converts the read document into an electrical image signal. The reading control unit 106 performs various kinds of image processing, such as binarization processing or halftone processing, on the image signal, and outputs high-definition image data. The method of optically reading a document may be either a sheet reading control method of reading a document with a fixed CIS image sensor or a book reading control method of reading a document fixed on a document table with a moving CIS image sensor.

The operation display unit 108 includes minimum necessary keys, such as a numerical value input key, a mode setting key, an enter key, and a cancel key, and a light emitting diode (LED) or a 7-segment display unit. The above-described various keys are realized by software keys displayed on the LCD 109, and can accept an operation from a user. When a user operation is not performed for a predetermined time, a backlight (backlight function) of LCD 109 is switched to OFF to reduce power consumption.

The communication control unit 110 controls communication between the MFP 100 and a communication network, and connects to an Internet service provider or communicates various data with a service management server. Further, the communication control unit 110 can determine whether the MFP 100 is connected to the Internet or only to a local area network (LAN). The communication control unit 110 and the communication network are connected by a known method, such as Hyper Text Transfer Protocol (HTTP) or Extensible Messaging and Presence Protocol (XMPP). The resolution conversion unit 111 performs resolution conversion processing, such as mutual conversion between millimeter-system image data and inch-system image data. The resolution conversion unit 111 can also execute enlargement/reduction processing of image data.

The encoding and decoding unit 112 performs encoding/decoding processing or enlargement/reduction processing on image data (uncompressed, encoded with Modified Huffman (MH), Modified Read (MR) or Modified Modified Read (MMR), in a Joint Bi-level Image Experts Group (JBIG) format, in a Joint Photographic Experts Group (JPEG) format, or the like) handled in the MFP 100. The recording control unit 113 converts image data to be printed into high-definition image data by performing various kinds of image processing such as, smoothing processing, recording density correction processing, or color correction, on the image data, and outputs the image data to the recording unit 114. The recording control unit 113 also plays a role of periodically acquiring state information data of the recording unit 114. The recording unit 114 is constituted by a laser beam printer, an inkjet printer, or the like, and prints the image data generated by the recording control unit 113 on a recording medium, such as a sheet.

The USB function control unit 115 performs protocol control in accordance with the USB communication standard. The USB host control unit 116 is a control unit for performing communication using a protocol defined by the USB communication standard. The USB communication standard is a standard for bidirectional high-speed data communication, and according to the USB communication standard, it is defined that a plurality of hubs or functions (slaves) can be connected to one host (master). That is, the USB host control unit 116 provides a function of a host in USB communication. Components other than the reading unit 107 and the LCD 109 are connected to each other via the bus 117.

<Operation Display Unit>

The operation display unit 108 according to the present exemplary embodiment has a screen in a tab form.

Figure 2:
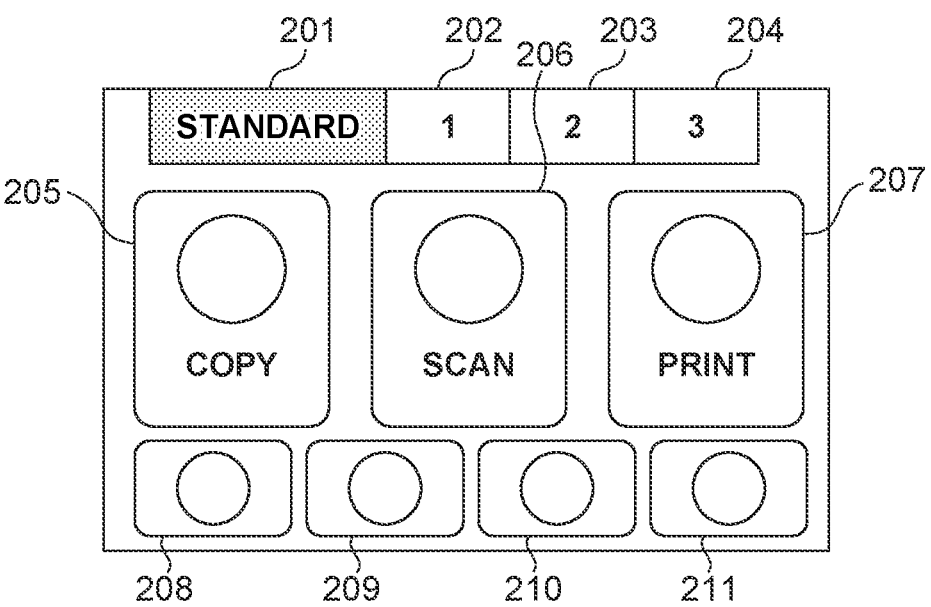
FIG. 2 is a diagram illustrating a standard home screen displayed on an operation display unit.

FIG. 2 is a view showing a standard home screen displayed on the operation display unit 108. A tab 201 is a tab corresponding to the standard home screen. Tabs 202, 203, and 204 are tabs each corresponding to a different custom home screen. The user can switch the home screen by pressing the tabs 201 to 204. The color of the tab 201 is changed from the colors of the other tabs to indicate that the screen of the tab 201 (i.e., the standard home screen) is currently displayed. The standard home screen includes a copy menu button 205, a scan menu button 206, a print menu button 207, a LAN button 208, a wireless connection button 209, a setting button 210, and a hint button 211. When the user presses each button, the screen transitions to a screen corresponding to the pressed button. More specifically, for example, when the copy menu button 205 is pressed, an area for inputting copy settings and a screen for instructing execution of copying are displayed. On the standard home screen, unlike a custom home screen to be described later, predetermined buttons are displayed without being arbitrarily selected by the user. However, the present invention is not limited to this mode. The buttons displayed on the standard home screen may be arbitrarily selected or changed by the user.

Figure 3:
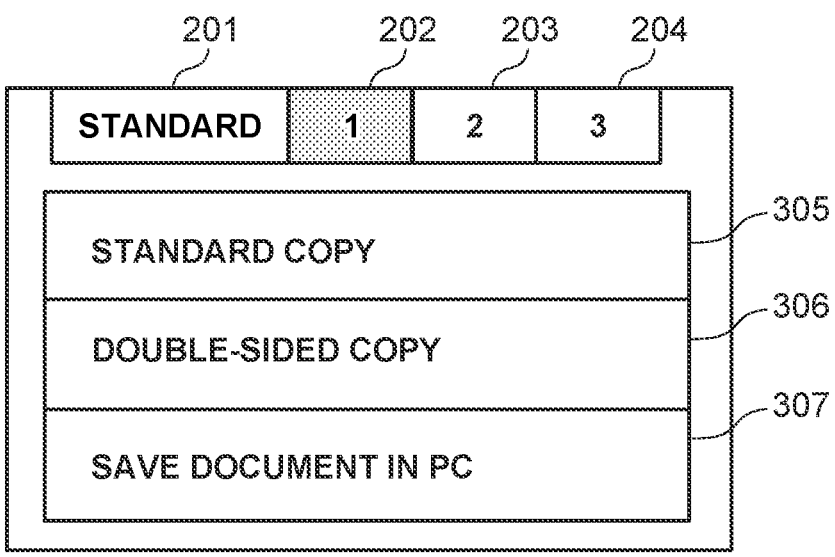
FIG. 3 is a diagram illustrating a custom home screen displayed on the operation display unit.

FIG. 3 is a view showing the custom home screen of the tab 202 displayed on the operation display unit 108.

The color of the tab 202 is changed from the colors of the other tabs to indicate that the custom home screen of the tab 202 is currently displayed. The custom home screen of the tab 202 has custom menus 305, 306, and 307, each of which is a user-customizable menu that allows the user to specify a function to be displayed at each menu position. In this figure, "standard copy" is set in the custom menu 305, "double-sided copy" is set in the custom menu 306, and "save document in personal computer (PC)" is set in the custom menu 307.

In the custom home screen, unlike the standard home screen, a menu associated with a setting of a processing to be executed from each menu can be registered. For example, in the copying executed by the copy menu button 205, it is necessary to separately set whether the copying is of a double-sided copy or a single-sided copy after the copy menu button 205 is pressed. However, in the copying executed from the custom menu 306, it is not necessary to separately set whether the copying is of a double-sided copy or a single-sided copy after the custom menu 306 is pressed. In addition, login information or cookie information may be stored in association with each home screen. Further, a lock can be set for each custom home screen. In the present exemplary embodiment, "lock" refers to control for preventing the custom home screen from being displayed without inputting a registered password to the password (authentication information) input screen. In a case where the tab corresponding to the custom home screen for which the lock is not set is operated, the custom home screen is displayed without displaying the password input screen. The custom menu setting and the lock setting of the custom home screen can be performed from the setting button 210 of FIG. 2.

Figure 4:
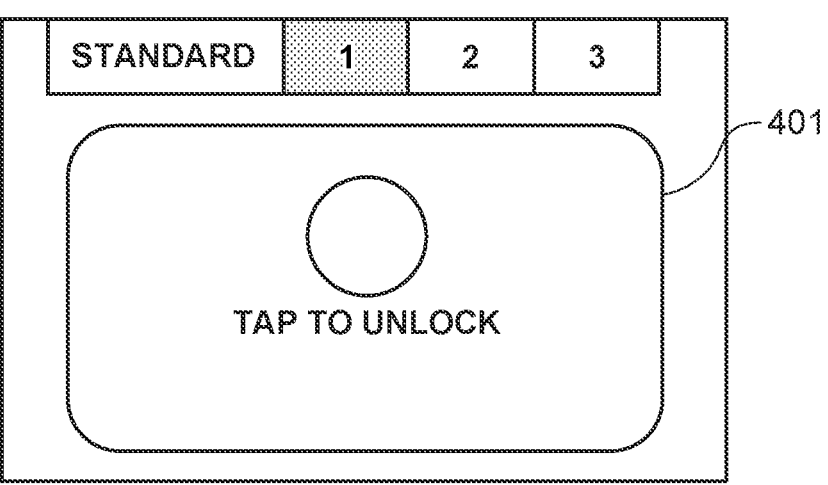
FIG. 4 is a diagram illustrating a lock screen of the custom home screen displayed on the operation display unit.

FIG. 4 illustrates a lock screen of the tab 202 displayed on the operation display unit 108. When the user selects the tab 202 which is a tab corresponding to the locked custom home screen, the custom home screen is not displayed, but the screen shown in FIG. 4 is displayed. When the user presses an unlock button 401, the password input screen is displayed. When the input password matches the correct (registered) password, the custom home screen of the tab 202 is displayed. The correct password is set for each tab. In the present exemplary embodiment, the locked state is a state in which a user operation on the menu screen corresponding to the selected tab (target tab) is restricted. For example, as shown in FIG. 4, the menu screen corresponding to the selected tab is not displayed. Alternatively, the menu screen corresponding to the selected tab may be displayed, but the display content may not be changed.

In the present exemplary embodiment, when the tab 202 is pressed again after the menu of another tab is displayed from the custom home screen of the tab 202 that is currently displayed, the lock screen is not displayed and the custom home screen of the tab 202 is displayed without the user inputting a password.

Figure 5:
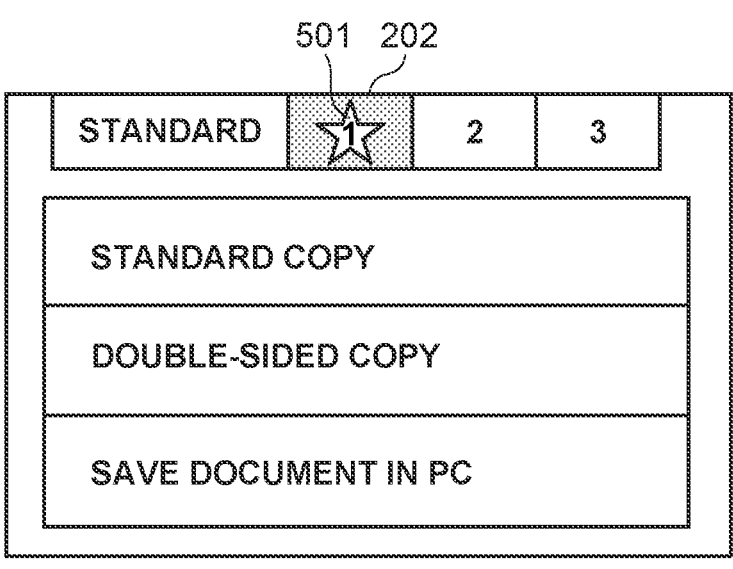
FIG. 5 is a diagram illustrating the custom home screen displayed on the operation display unit after unlocking.

FIG. 5 illustrates an unlocked custom home screen displayed on the operation display unit 108. A lock-released icon 501 indicates that the lock setting of the custom home screen corresponding to the currently displayed tab 202 is released. The lock-released icon 501 may be any display as long as that the display indicates the lock setting released state of the custom home screen corresponding to the currently displayed tab 202, and may be an icon as shown in FIG. 5 or an icon (unlocked icon) as shown in a tab 812 of a display screen 830 in FIG. 8 described below.

In the present exemplary embodiment, the user can lock the tab by pressing the lock-released icon (i.e., the tab 202 in FIG. 5). The lock-released icon 501 is not displayed in the tab for which the lock setting is disabled, and the lock processing is not performed even if the tab of the currently displayed custom home screen is pressed. The setting as to whether to enable or disable the tab lock setting is performed in advance for each tab. Whether the tab lock setting is enabled or disabled may be set, for example, from the setting button 210.

<Flowchart>

Figure 6:
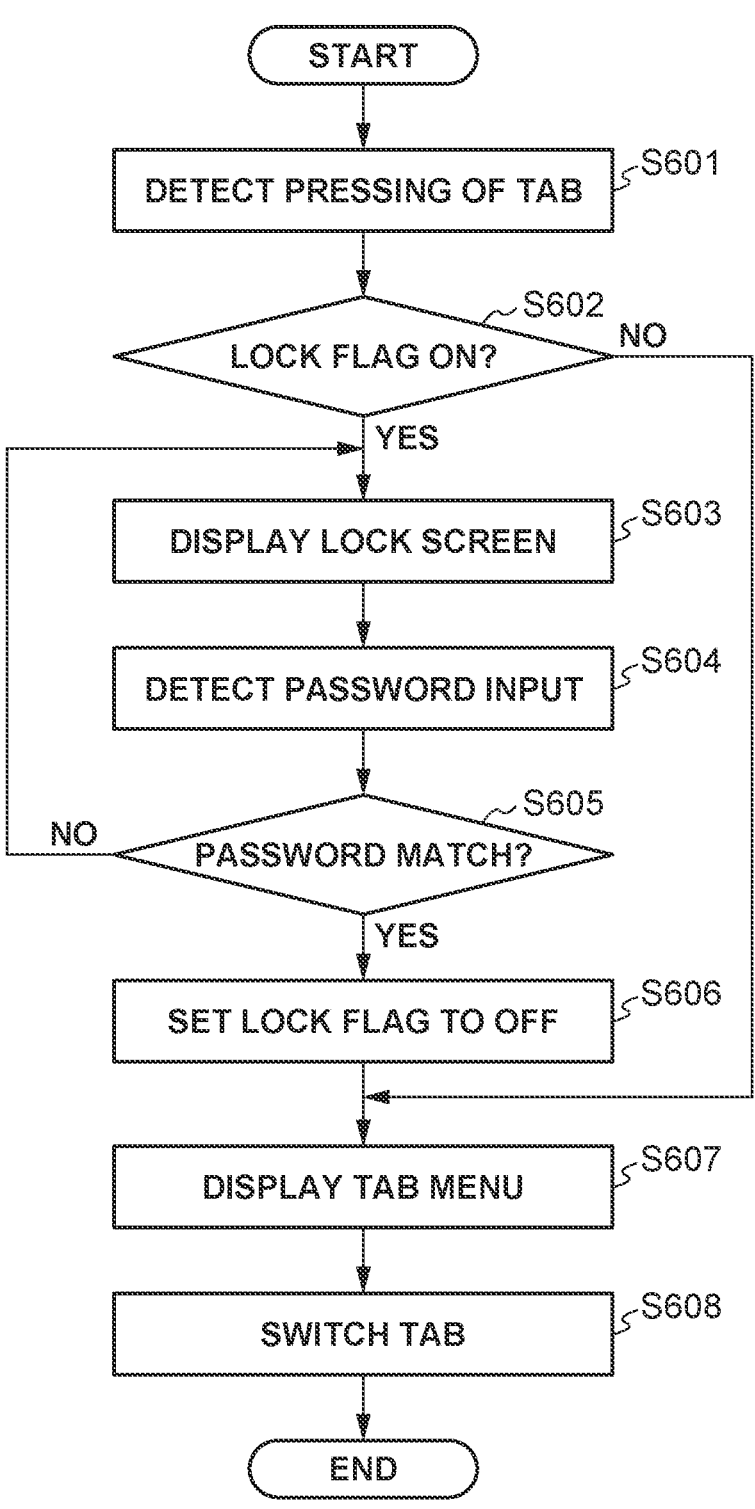
FIG. 6 is a flowchart illustrating an unlock sequence of the custom home screen.

FIG. 6 is a flowchart for explaining an unlocking sequence according to the present exemplary embodiment. A flow of processing in which the user unlocks the tab will be described with reference to FIG. 6. The series of processing shown in this flowchart is performed by the CPU 101 of MFP 100 loading the program code stored in the ROM 102 to the RAM 103 and executing the program code. This processing is executed when the user presses a tab of the custom home screen. This processing is started when the operation display unit 108 detects a user operation, such as a touch.

First, in step S601, the CPU 101 detects a tab pressed by the user.

In step S602, the CPU 101 determines whether a lock flag of the tab is ON. The lock flag of the tab is individually provided for each tab, and is turned ON when the tab is locked. Details of the tab locking operation will be described below. If the lock flag is OFF (NO in step S602), the processing proceeds to step S607, and the CPU 101 displays a menu of the tab (for example, a custom home screen). The lock flag of a tab whose lock setting is disabled is always OFF. As described above, the setting as to whether the lock setting of the tab is enabled or disabled is set in advance for each tab.

If the lock flag is ON (YES in step S602), in step S603, the CPU 101 displays the lock screen as shown in FIG. 4. In step S604, when the CPU 101 detects a password input from the user, in step S605, the CPU 101 determines whether the input password matches the correct password (e.g. a password registered in advance). If the input password does not match the correct password (NO in step S605), the processing returns to step S603, and the lock screen is displayed again. If the input password matches the correct password (YES in step S605), the lock flag is set to OFF in step S606, and in step S607, the tab menu is displayed.

In step S608, if the tab is switched to another tab by a user operation, the CPU 101 maintains the state of the lock flag of the tab before the switching, which has been set to OFF in step S606, to OFF. Thus, when the pressing of the tab is detected again in the S601, in step S602, it is determined that the lock flag is OFF, and the user can display the tab menu without inputting the password. The above is the flow of the processing for unlocking the tab.

Next, processing performed when the user locks the tab will be described.

Figure 7:
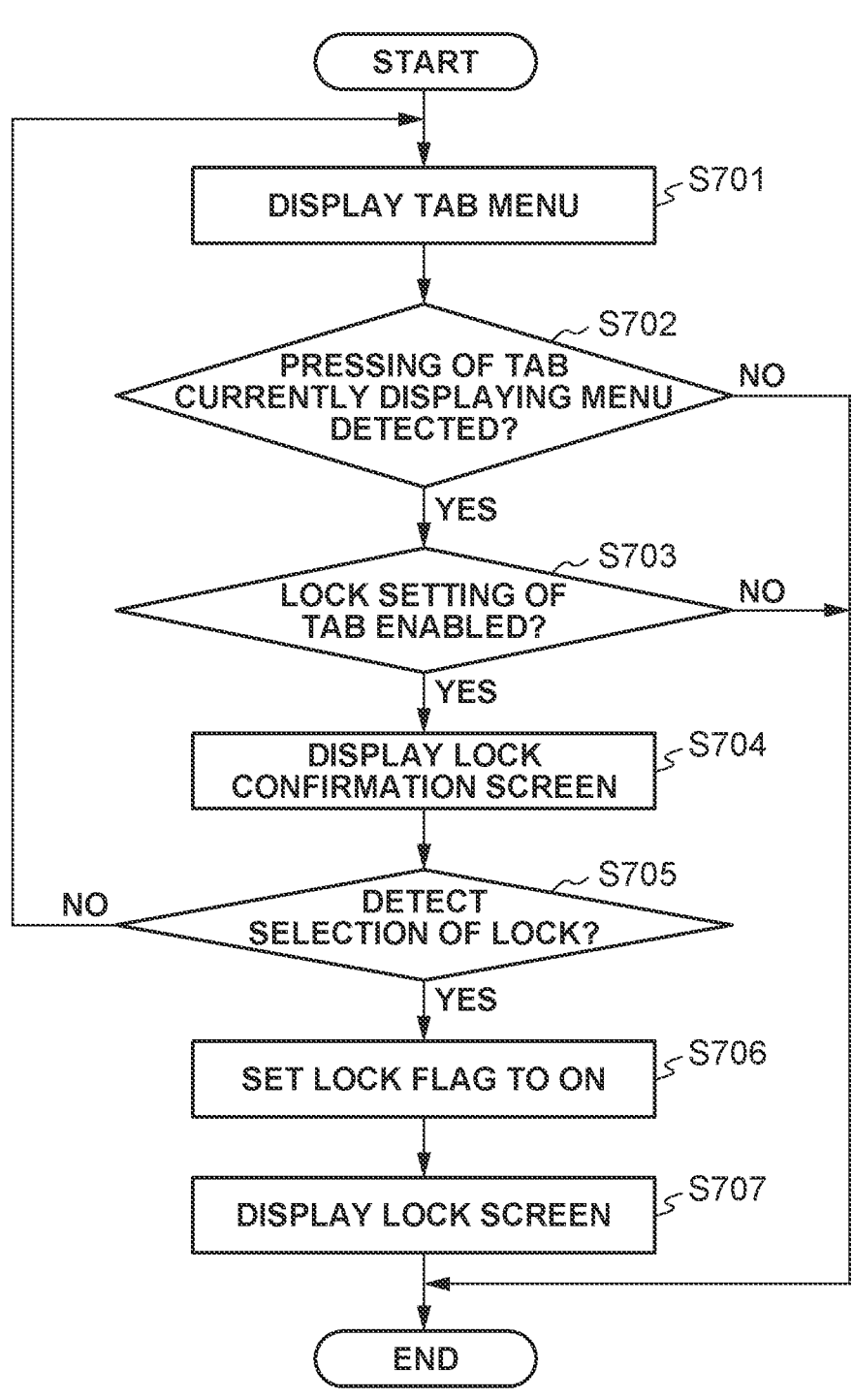
FIG. 7 is a flowchart illustrating a lock sequence of the custom home screen by a tab operation.

FIG. 7 is a flowchart for explaining a processing sequence when the user locks a tab. The series of processing shown in this flowchart is performed by the CPU 101 of the MFP 100 loading the program code stored in the ROM 102 to the RAM 103 and executing the program code. This processing is started when the tab enters an unlocked state by a release operation, such as password authentication by the user.

In step S701, the CPU 101 displays a tab menu on the operation display unit 108. In step S702, the CPU 101 determines whether pressing of a tab currently displaying a menu on the operation display unit 108 has been detected. In this step, for example, if the CPU 101 determines that the pressing of the tab is not detected before a predetermined time elapses (NO in step S702), this processing ends. On the other hand, if the CPU 101 determines that the pressing of the tab has been detected within the predetermined time (YES in step S702), in step S703, the CPU 101 determines whether the lock setting of the tab is enabled. As described above, the setting as to whether the lock setting of the tab is enabled or disabled is set in advance for each tab. If the lock setting of the tab is disabled (NO in step S703), the processing ends. When the lock setting of the tab is enabled (YES in step S703), in step S704, a lock confirmation screen is displayed. The lock confirmation screen is, for example, a display screen 850 in FIG. 8. The user selects whether to lock the tab on the lock confirmation screen. In step S705, in a case where the CPU 101 detects a selection of not to lock by a user operation on the lock confirmation screen (NO in step S705), the processing returns to step S701. In a case where the selection of locking is detected (YES in step S705), the processing proceeds to step S706. In step S706, the CPU 101 sets the lock flag to ON, and in step S707, displays the lock screen. Then, the processing ends. The above is the flow of the processing in a case where the tab is locked by the user.

Next, a series of processes for locking and unlocking the tabs in FIGS. 6 and 7 will be described with reference to screens displayed on the operation display unit 108.

Figure 8:
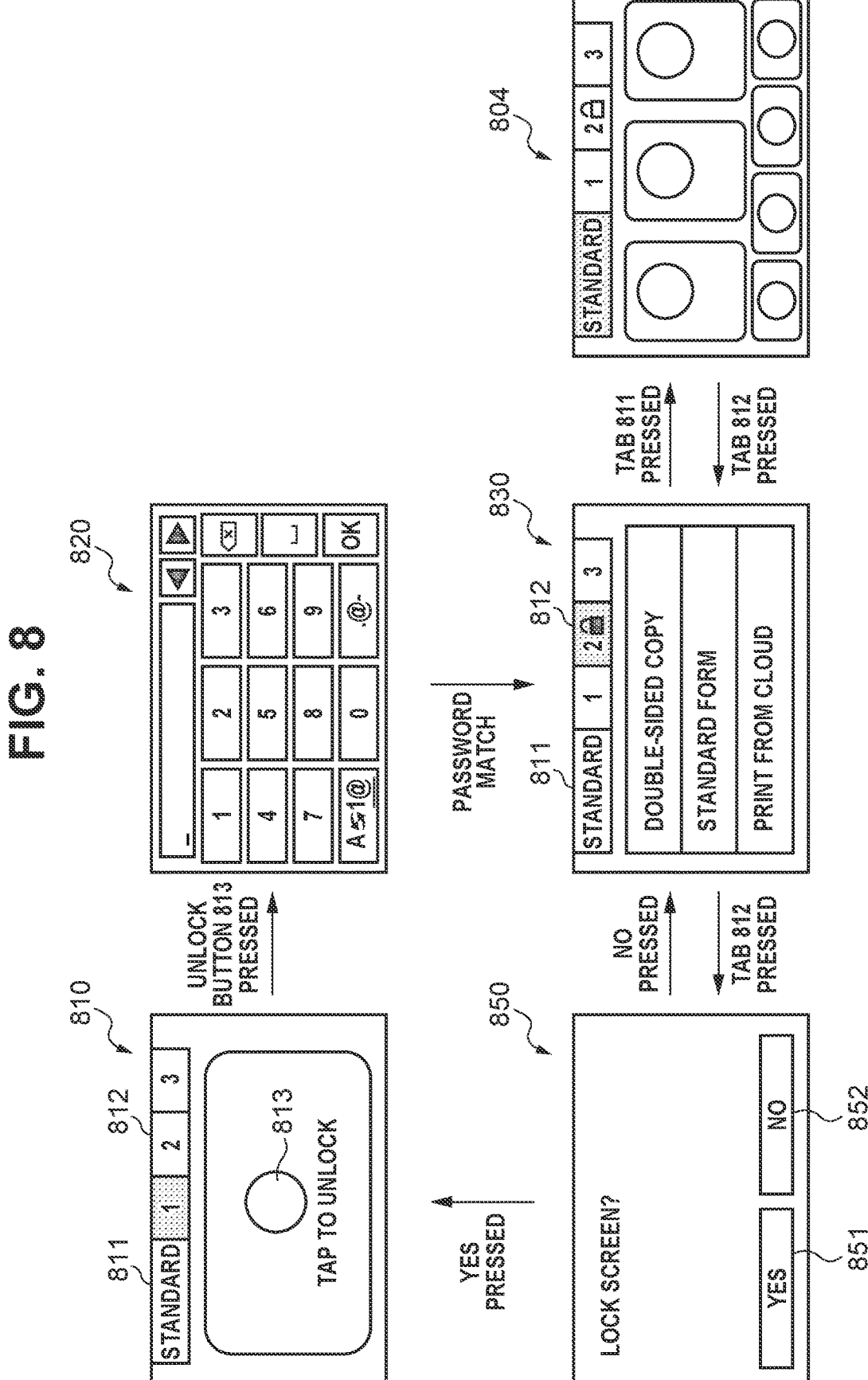
FIG. 8 is a diagram illustrating a screen transition of a display screen.

FIG. 8 is a diagram illustrating the transition of the display screen when the tab is locked and unlocked. First, a display screen 810 is a display screen displayed when the user presses the tab 812 the lock flag of which is ON. The display screen 810 is a display screen corresponding to steps S601 to S603 in the flowchart of FIG. 6. When the user presses an unlock button 813 on the display screen 810, a display screen 820 as a password input screen is displayed.

When the user inputs a correct password, the display screen 830 is displayed. The display screen 830 is a display screen corresponding to the tab 812, and is a screen corresponding to step S607 in FIG. 6. In the display screen 830, a mark indicating that the lock is released (unlocked) is displayed on the tab 812.

When the user presses a tab 811, which is a tab of the standard home screen, on the display screen 830 of the tab 812, a standard home screen 804 is displayed. At this time, the tab 812 in the unlocked state is maintained in the unlocked state. When the operation on a display screen 804 is finished and the user presses the tab 812 again, the display screen 830 is displayed without the user performing the unlocking operation. When the user presses the tab 812 on which the mark indicating the unlocked state is displayed, the display screen 850 is displayed. That is, in the present exemplary embodiment, when a tab is pressed in a state in which a tab menu is displayed, the menu screen corresponding to the tab is locked again. The above (that is, the screen transition from the display screen 830 to the display screen 850) is a screen transition corresponding to steps S702 to S704 in FIG. 7. The display screen 850 is a display screen for selecting whether or not to lock the screen, and when the user presses a YES button 851, the tab 812, which is the tab concerned, is switched to the locked state. When a NO button 852 is pressed, a display screen 830 is displayed. The above is the description of the locking and unlocking of the tab using the display screen displayed on the operation display unit 108.

Next, a method for locking all tabs for which the lock setting is enabled when the backlight of the operation display unit 108 is turned off will be described. The backlight of the operation display unit 108 is turned on when the operation display unit 108 is operated by the user, and is turned off to reduce power consumption if the operation by the user is not detected for a predetermined time in the on state.

Figure 9:
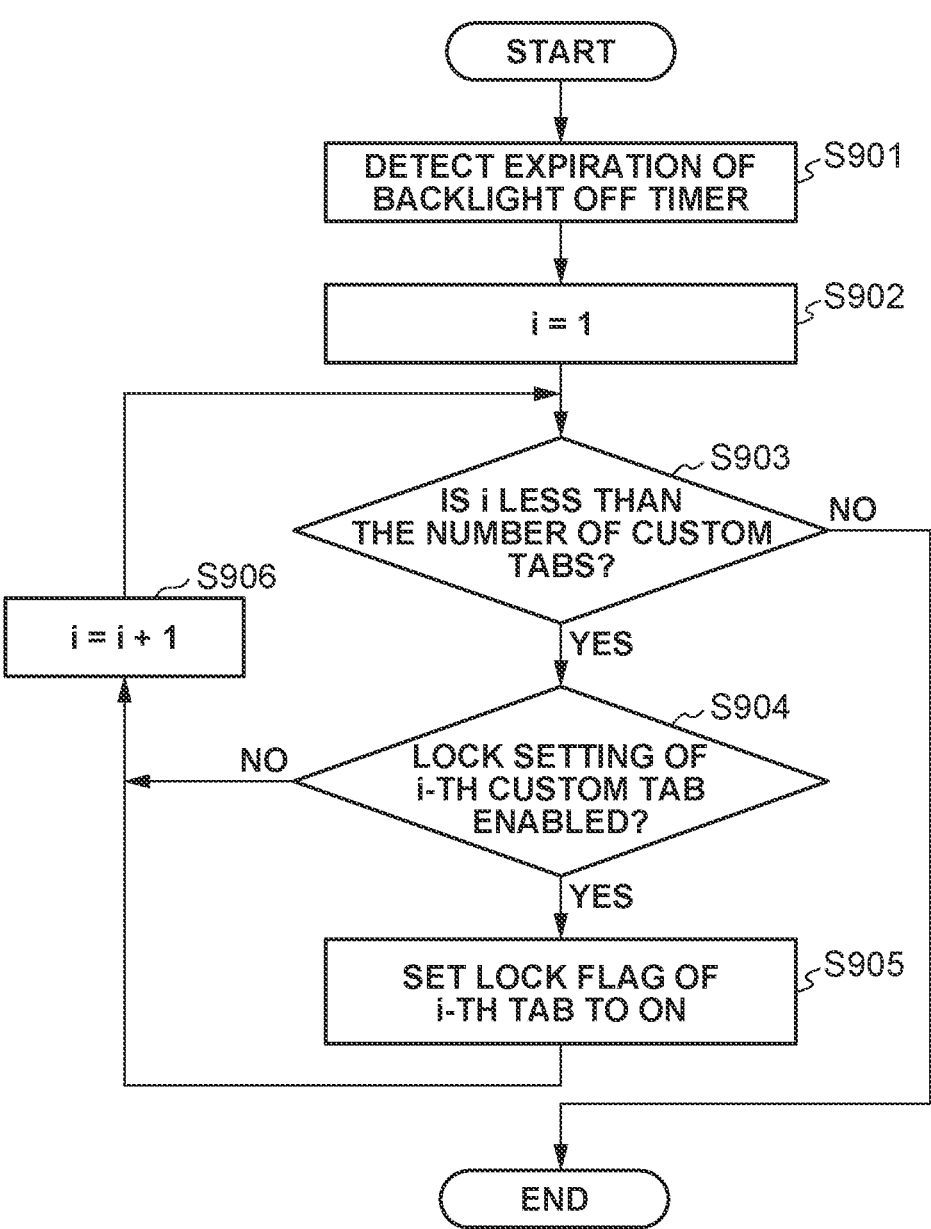
FIG. 9 is a flowchart illustrating a custom home screen lock sequence when a backlight is turned off.

FIG. 9 is a flowchart for explaining a lock processing sequence when the backlight is turned off. The series of processing shown in this flowchart is performed by the CPU 101 of the MFP 100 loading the program code stored in the ROM 102 to the RAM 103 and executing the program code.

In step S901, when the CPU 101 detects the expiration of the backlight off timer, in step S902, the CPU 101 initializes the index i to 1. In step S903, the CPU 101 determines whether the index i is less than or equal to the number of custom tabs (tabs of custom home screens). In a case where the index i is less than or equal to the number of custom tabs (YES in S903), the processing proceeds to step S904. In step S904, the CPU 101 determines whether the lock setting of the i-th custom tab is enabled. If the lock setting of the i-th custom tab is enabled (YES in step S904), in step S905, the CPU 101 sets the lock flag of the i-th custom tab to ON.

If the lock setting of the i-th custom tab is disabled (NO in step S904), the processing proceeds to step S906. Also, after setting the lock flag of the i-th custom tab to ON in step S905, the processing proceeds to step S906. In step S906, the CPU 101 adds 1 to the index i. After performing step S906, it is determined again in step S903 whether the index i is less than or equal to the number of custom tabs. If the index i is larger than the number of tabs (NO in step S903), the CPU 101 ends this processing. Thus, the tabs can be locked in ascending order of tab number until the index i becomes equal to the number of custom tabs. That is, all tabs for which the lock setting is enabled can be set to the locked state at the timing of backlight off. By this processing, even when the user forgets an operation, such as logout, when the user finishes the operation, the tab to be set in the locked state can be locked after the elapse of a predetermined time. As described above, according to the present exemplary embodiment, the operability of the display screen is improved. Specifically, when the screen of the tab in the unlocked state that is currently being displayed transitions to the screen of another tab, the unlocked state of the tab before the transition is maintained. Thus, for example, in a case where an operation of moving between a plurality of tabs is performed, it is possible to save time and effort of performing the unlocking operation many times, and thus operability is improved. In the present exemplary embodiment, the display screen of the MFP 100 has been described as an example. However, the present exemplary embodiment is not limited thereto, and the present exemplary embodiment may be applied to any device as long as the device includes an operation display unit. Further, for example, each of the above-described screens for executing the setting of the MFP 100 or causing the MFP 100 to execute various processes may be displayed on another apparatus (a smartphone or a PC) communicating with the MFP 100. Then, the present invention may be applied to a screen displayed on the other apparatus.

Figures 10A, 10B:
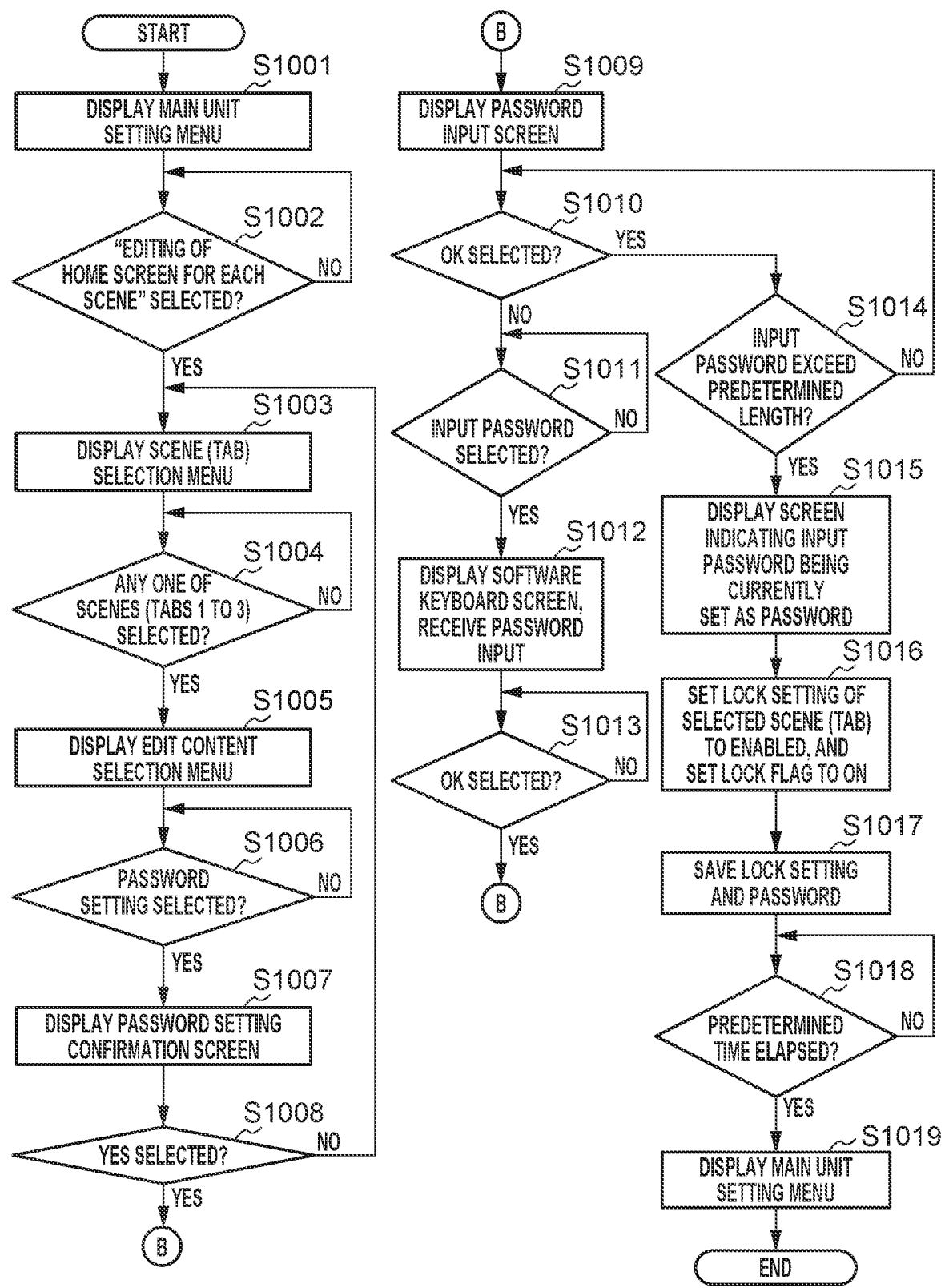
FIGS. 10A and 10B are flowcharts illustrating a sequence of setting an unlock password for the custom home screen.

Next, processing performed when the user sets a password for locking a tab (processing at the time of a lock operation) will be described. FIGS. 10A and 10B are flowcharts showing a sequence for setting an unlock password for the custom home screen. The series of processing shown in this flowchart is performed by the CPU 101 of the MFP 100 loading the program code stored in the ROM 102 to the RAM 103 and executing the program code. The processing of this flowchart is started by the user selecting the setting button 210 on the standard home screen shown in FIG. 2.

Figure 11:
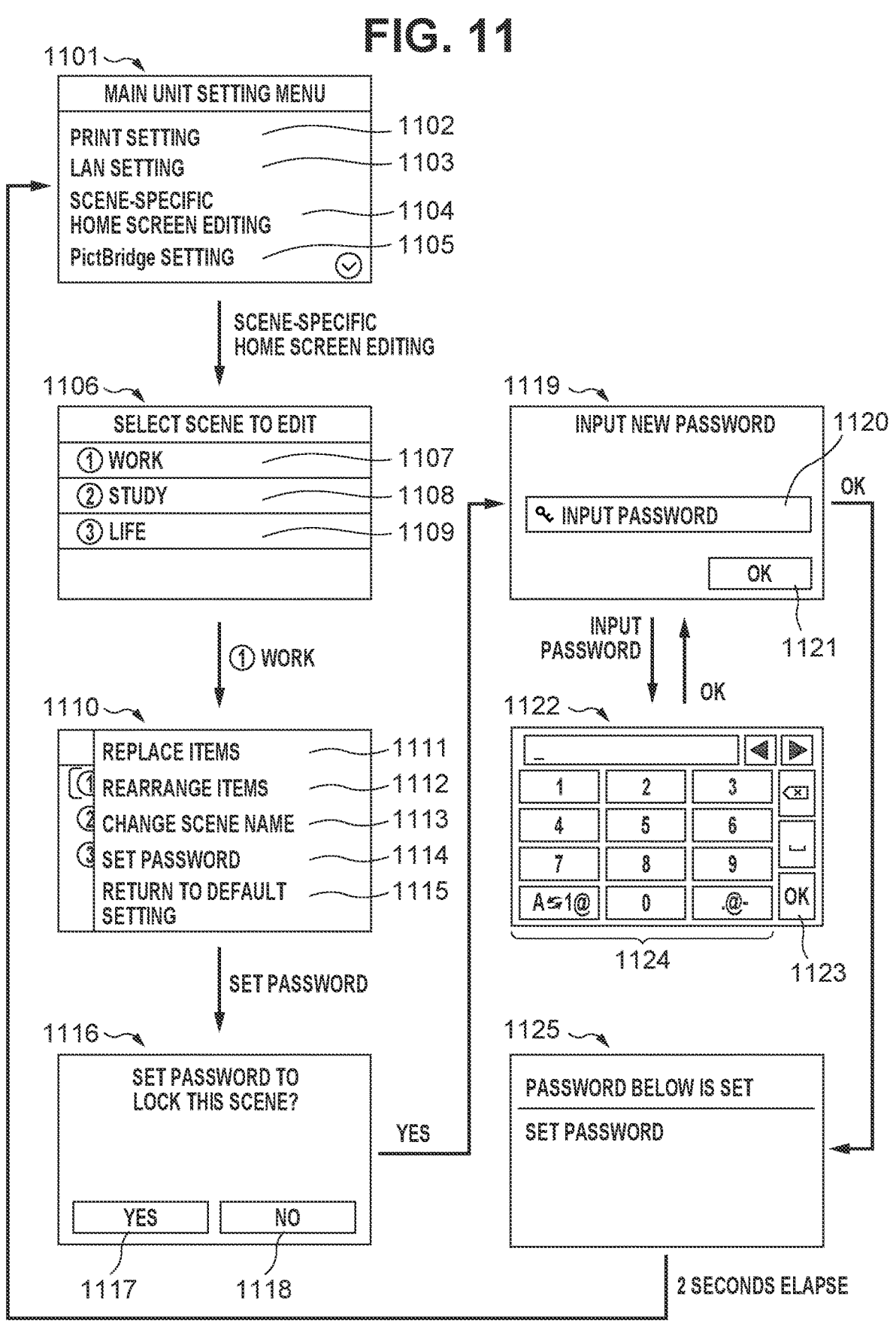
FIG. 11 is a diagram illustrating a screen at the time of setting the unlock password for the custom home screen.

FIG. 11 is a diagram showing a screen image at the time of setting (registering) an unlock password for the custom home screen. Each screen of FIG. 11 is displayed in accordance with the flowchart shown in FIGS. 10A and 10B. The password setting flow will be described below with reference to the flowcharts of FIGS. 10A and 10B.

In step S1001, the CPU 101 displays a main unit setting menu screen 1101. The main unit setting menu screen 1101 in FIG. 11 includes a print setting 1102, a LAN setting 1103, a scene-specific home screen editing 1104, and a PictBridge setting 1105 in the main unit setting menu screen 1101. The print setting 1102, the LAN setting 1103, and the PictBridge setting 1105 will not be described.

In step S1002, the CPU 101 determines whether the scene-specific home screen editing 1104 has been selected. In a case where the CPU 101 determines that the scene-specific home screen editing 1104 has been selected (YES in step S1002), the processing proceeds to step S1003, and if the CPU 101 determines that the scene-specific home screen editing 1104 has not been selected (NO in step S1002), the processing of step S1002 is repeated.

In step S1003, the CPU 101 displays a scene selection menu screen 1106.

The scene selection menu screen 1106 in FIG. 11 is a menu for selecting a scene to be edited.

A tab 1107 indicates "work" as the first scene (tab), a tab 1108 indicates "study" as the second scene (tab), and a tab 1109 indicates "life" as the third scene (tab).

In step S1004, the CPU 101 determines whether any of the scenes (tabs) from among the tabs 1107 to 1109 has been selected by the user. In a case where the CPU 101 determines that any of the scenes (tabs) from among the tabs 1107 to 1109 has been selected (YES in step S1004), the processing proceeds to step S1005. In a case where the CPU 101 determines that any of the scenes (tabs) from among the tabs 1107 to 1109 has not been selected (NO in step S1004), the processing of step S1004 is repeated.

In step S1005, the CPU 101 displays an edit content selection menu screen 1110.

The edit content selection menu screen 1110 in FIG. 11 includes settings 1111 to 1115. A setting 1111, a setting 1112, a setting 1113, a setting 1114, and a setting 1115 indicate options for executing "replace items", "rearrange items", "change scene name", "set password", and "return to default setting", respectively.

In step S1006, the CPU 101 determines whether the setting 1114 ("set password") has been selected. In a case where the CPU 101 determines that the setting 1114 has been selected (YES in step S1006), the processing proceeds to step S1007. In a case where the CPU 101 determines that the setting 1114 has not been selected (NO in step S1006), the processing of step S1006 is repeated.

In step S1007, the CPU 101 displays a password setting confirmation screen 1116.

The password setting confirmation screen 1116 in FIG. 11 is a screen image of a password setting confirmation screen, and includes a YES button 1117 and a NO button 1118.

In step S1008, the CPU 101 determines whether the user has selected the YES button 1117. In a case where the CPU 101 determines that the user has selected the YES button 1117 (YES in step S1008), the processing proceeds to step S1009. In a case where the CPU 101 determines that the user has selected the NO button 1118 (NO in step S1008), the processing returns to step S1003.

In step S1009, the CPU 101 displays an input new password screen 1119.

The input new password screen 1119 in FIG. 11 includes an input password button 1120 for displaying a software keyboard screen for receiving an input of a password setting, and an OK button 1121 for the determination of a password.

In step S1010, the CPU 101 determines whether the OK button 1121 has been pressed on the input new password screen 1119. In a case where the CPU 101 determines that the OK button 1121 has been pressed (YES in step S1010), the processing proceeds to step S1014. In a case where the CPU 101 determines that the OK button 1121 has not been pressed (NO in step S1010), the processing proceeds to step S1011.

In step S1011, the CPU 101 determines whether the input password button 1120 has been selected by the user. In a case where the CPU 101 determines that the input password button 1120 has been selected by the user (YES in step S1011), the processing proceeds to step S1012. In a case where the CPU 101 determines whether the input password button 1120 has not been selected by the user (NO in step S1011), the processing of step S1011 is repeated.

In step S1012, the CPU 101 displays a software keyboard screen 1122, and accepts input of a character string or a numerical sequence to be set as a password.

The software keyboard screen 1122 in FIG. 11 includes an OK button 1123 indicating the end of software keyboard input, and a key group 1124 for inputting a character string of a password.

In step S1013, the CPU 101 determines whether the OK button 1123 has been selected. In a case where the CPU 101 determines that the OK button 1123 has been selected (YES in step S1013), the processing returns to step S1009, and in a case where the CPU 101 determines that the OK button 1123 has not been selected (NO in step S1013), the processing of step S1013 is repeated. In a case where the CPU 101 determines that the OK button 1123 has been selected in step S1013 and the processing returns to step S1009, the input new password screen 1119 is displayed again. At this time, a character string or a numerical sequence indicating the password input by the user is displayed (not shown) on the input password button 1120.

In step S1014, which is a process subsequent to the step S1010 in the case where the CPU 101 determines that the OK button 1121 has been pressed in step S1010, the CPU 101 determines whether the input password is longer than or equal to a predetermined length. The predetermined length is the minimum number of characters that can be used as a password. In a case where the CPU 101 determines that the input password is longer than or equal to the predetermined length (YES in step S1014), the processing proceeds to step S1015. In a case where the CPU 101 determines that the input password less than the predetermined length (NO in step S1014), the processing returns to step S1010. If the CPU 101 determines that the input password is less than the predetermined length in step S1014, a screen indicating that the input password is less than the predetermined length may be displayed.

In step S1015, the CPU 101 displays a screen indicating that the input character string or numerical sequence is set as a password. For example, the CPU 101 displays a screen 1125 in FIG. 11. The screen 1125 shows a screen image during password setting, and is a screen showing the user that the input password is currently set.

In step S1016, the CPU 101 sets the lock setting for the selected scene (tab) to enabled, and sets the lock flag to ON. Thus, after the password is changed, in a case where the CPU 101 detects pressing of the tab selected in step S1003 in step S601 in FIG. 6, the locked state is immediately set even when the scene (tab) for which the password is set is in the unlocked state, since the CPU 101 determines that the lock flag is ON in step S602 in FIG. 6, meanwhile the unlocked state of other scenes (tabs) is continued.

In step S1017, the CPU 101 stores the lock setting for the scene (tab) selected by the user and the input password in the nonvolatile memory 118. Since the CPU 101 displays the main unit setting menu screen 1101 when a predetermined time elapses, in step S1017, the CPU 101 activates a timer for displaying the main unit setting menu screen 1101.

In step S1018, the CPU 101 determines whether a predetermined time has elapsed since the lock setting and the password have been stored. For example, the CPU 101 determines whether two seconds have elapsed since the lock setting and the password have been stored. In a case where the CPU 101 determines that the predetermined time has elapsed (YES in step S1018), the processing proceeds to step S1019. In a case where the CPU 101 determines that the predetermined time has not elapsed (NO in step S1018), the processing of step S1018 is repeated.

In step S1019, the CPU 101 ends the display of the screen 1125 showing the set password and displays the main unit setting menu screen 1101 again.

As described above, even when the scene (tab) selected by the user is in the unlocked state (lock flag OFF), the scene (tab) can be immediately returned to the locked state (lock flag ON) based on the setting or change of the password of the scene (tab).

Thus, even in a case where the user does not perform the tab operation shown in FIG. 7 or the backlight off operation shown in FIG. 9, the scene (tab) can be locked based on detection of the pressing of the scene (tab) for which the password is set after the password is set or changed, thereby providing a display screen with higher security.

In the present exemplary embodiment, the lock flag of the target scene (tab) is uniformly set to ON by setting the password. However, the lock flag may not be set to ON in a case where the set password is the same as the already set password.

Next, a description will be given of FIG. 12 which is a flowchart illustrating control performed when a power-off operation is performed in the apparatus in the power-on state according to the present exemplary embodiment.

In step S1201, the CPU 101 determines whether a power-off operation on the operation display unit 108 is detected. In a case the CPU 101 determines that a power-off operation on the operation display unit 108 has been detected (YES in step S1201), the processing proceeds to step S1202, and in a case where the CPU 101 determines that a power-off operation on the operation display unit 108 has not been detected (NO in step S1201), the processing of step S1201 is repeated.

In step S1202, the CPU 101 stores, in the nonvolatile memory 118, information indicating which scene (tab) has been displayed last among the scenes (tabs) of the standard home screen and the custom home screen, and ends the processing of this flowchart.

Figure 13:
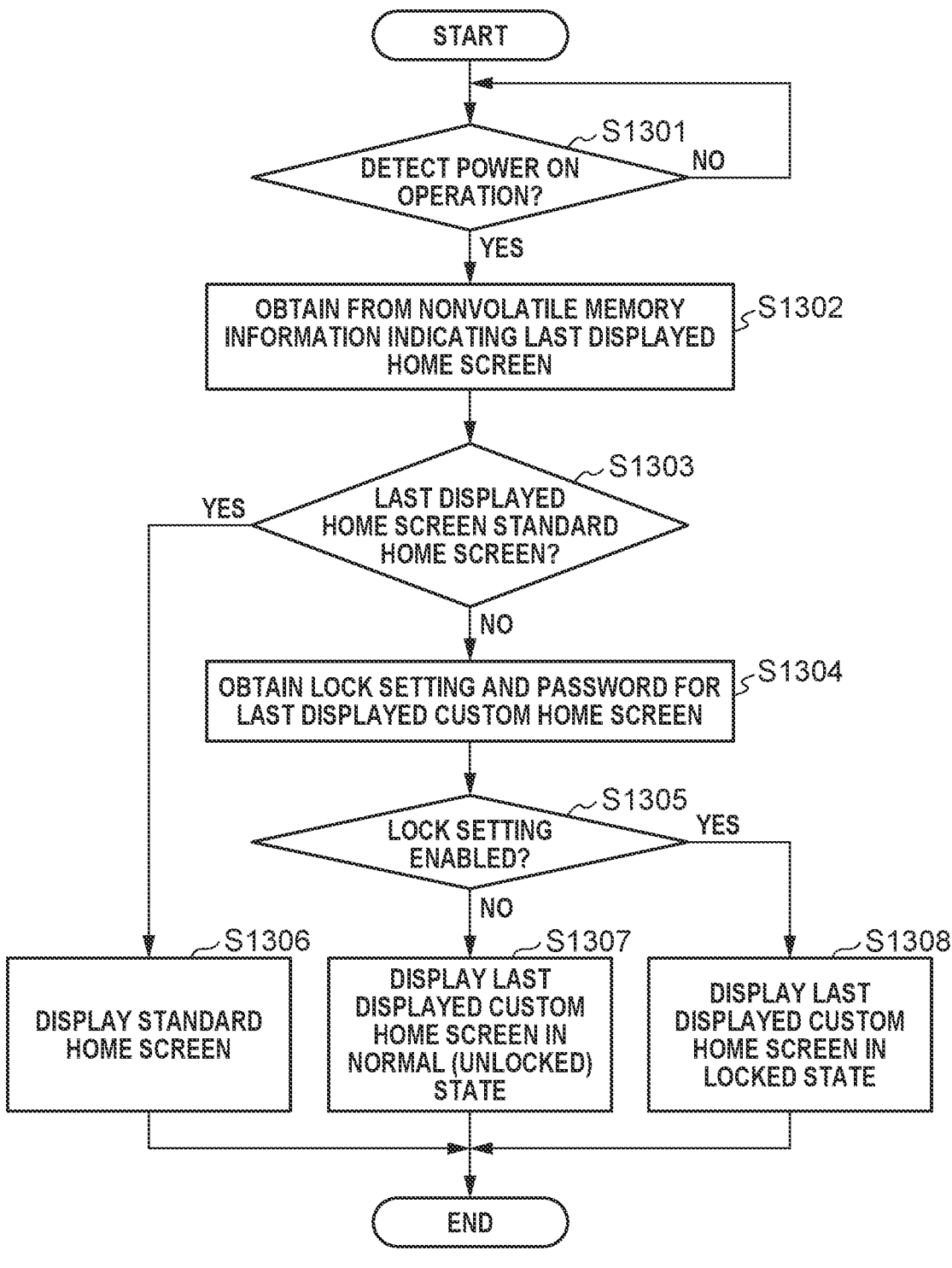

Next, a description will be given of FIG. 13 which is a flowchart illustrating control performed when a power-on operation is performed in the apparatus in the power-off state according to the present exemplary embodiment.

In step S1301, the CPU 101 determines whether a power-on operation on the operation display unit 108 has been detected. In a case where the CPU 101 determines that a power-on operation on the operation display unit 108 has been detected (YES in step S1301), the processing proceeds to step S1302, and in a case where the CPU 101 determines that a power-on operation on the operation display unit 108 has not been detected (NO in step S1301), the processing of step S1301 is repeated.

Figure 12:
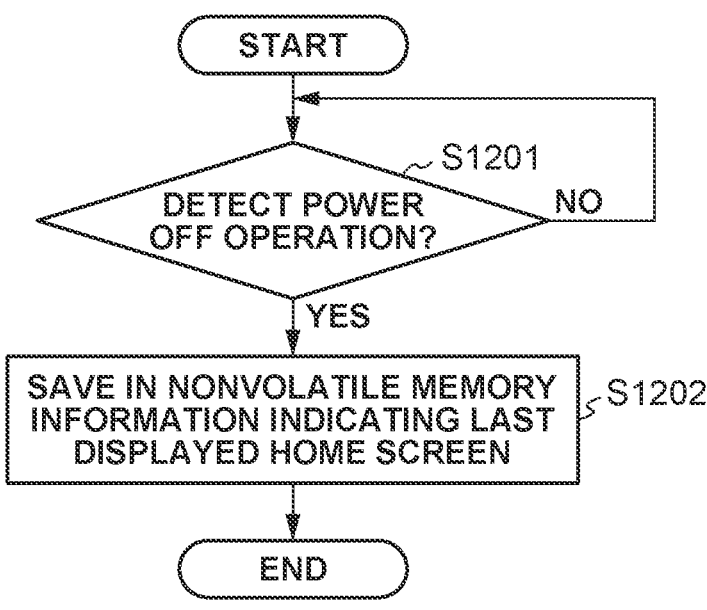
FIG. 12 is a flowchart showing a characteristic sequence at the time of power-off.

In step S1302, the CPU 101 acquires, from the nonvolatile memory 118, information indicating which scene (tab) has been displayed last, which has been stored in step S1202 in FIG. 12.

In step S1303, the CPU 101 determines whether the home screen displayed last is the standard home screen, based on the saved information indicating which scene (tab) has been displayed last. In a case where the CPU 101 determines that the home screen displayed last is the standard home screen (YES in step S1303), the processing proceeds to step S1306. In a case where the CPU 101 determines that the home screen displayed last is not the standard home screen (NO in step S1303), the processing proceeds to step S1304.

In step S1306, the CPU 101 displays the standard home screen shown in FIG. 2.

In step S1304, the CPU 101 reads the lock setting and the password of the custom home screen corresponding to the scene (tab) displayed last from the nonvolatile memory 118.

In step S1305, the CPU 101 determines whether the read lock setting is enabled. In a case where the CPU 101 determines that the read lock setting is enabled (YES in step S1305), the processing proceeds to step S1308, and in a case where the CPU 101 determines that the read lock setting is not enabled (NO in step S1305), the processing proceeds to step S1307.

In step S1307, the CPU 101 displays the custom home screen corresponding to the scene (tab) displayed last in the normal state (unlocked state) as shown in FIG. 3.

In step S1308, the CPU 101 displays the custom home screen in the locked state as shown in FIG. 4.

By performing the above-described control, it is possible to automatically restore the home screen, which has been displayed last before the power is turned off, when the power is turned on, and to improve the operability by reducing the number of tab operations. Further, it is possible to switch whether to display the home screen in the locked state, based on the information regarding whether the lock setting of the home screen displayed last before the power OFF state is set is enabled.

Other Embodiments

While, in the above-described embodiment, the lock flag is set to OFF by inputting the password, and the menu screen corresponding to the tag is displayed, the present invention is not limited to this mode. For example, the lock flag may be set to OFF by biometric authentication or the like. Alternatively, the lock flag may be turned off by Internal Chip (IC) card authentication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all equivalent structures and functions.

This application claims the benefit of Japanese Patent Application No. 2022-170313, filed Oct. 25, 2022, which is hereby incorporated by reference herein in its entirety.

What is claimed is:

1. A control apparatus comprising:
one or more processors; and
one or more memories storing instructions that, when executed by the one or more processors, cause the control apparatus to function as:

a display control unit configured to display, on a display unit, a screen regarding inputting a password corresponding to a first menu screen in a case where a user operation is received for displaying the first menu screen while the first menu screen is in a locked state, wherein the first menu screen is one of a plurality of menu screens;

a lock control unit configured to set the first menu screen to an unlocked state based on the password input by a user, wherein the display control unit displays, on the display unit, the first menu screen in a state where the locked state is released; and a setting unit configured to set the password for releasing the locked state of the first menu screen, wherein the display control unit displays, based on an instruction to display a second menu screen, the second menu screen in a state where the first menu screen is displayed, and, based on an instruction to display the first menu screen being received on the second menu screen displayed based on the instruction to display the second menu screen, the display control unit displays the first menu screen without displaying the screen regarding inputting the password, wherein the second menu screen is one of the plurality of menu screens and is different from the first menu screen, wherein the lock control unit sets the first menu screen in the unlocked state to the locked state based on the setting unit setting the password for releasing the locked state of the first menu screen.

2. The control apparatus according to claim 1, wherein the first menu screen is displayed in a case where a password input while the screen regarding inputting the password is being displayed matches a password set in advance in the first menu screen.

3. The control apparatus according to claim 1, wherein, in a case where a predetermined operation is performed on the first menu screen, the screen regarding inputting the password is displayed.

4. The control apparatus according to claim 3, wherein the predetermined operation is an operation of pressing a first tab corresponding to the first menu screen.

5. The control apparatus according to claim 1, wherein the lock control unit performs control to the locked state based on a lock setting individually set for each of the menu screens in advance.

6. The control apparatus according to claim 1, wherein, in a case where the setting unit sets a password of the first menu screen in the unlocked state, the lock control unit controls the first menu screen in the unlocked state to be in the locked state in a case where the passwords before and after the setting do not match.

7. The control apparatus according to claim 1, further comprising a storage unit configured to store information about a menu screen displayed last among the plurality of menu screens when the control apparatus is powered off, wherein the display control unit displays the screen for inputting the password corresponding to the first menu screen displayed last when the control apparatus is powered off, based on the information about the tab displayed last among the plurality of tabs when the control apparatus is powered on.

8. The control apparatus according to claim 1, wherein the display control unit displays the screen regarding inputting a password in a case where a backlight is turned off in a state where the first menu screen is displayed and a user operation to turn on the backlight is received thereafter.

9. The control apparatus according to claim 8, wherein the backlight is turned off based on the user operation not being received by the control apparatus for a predetermined time.

10. A control method for a control apparatus, comprising:

displaying a screen, on a display unit, regarding inputting a password, corresponding to a first menu screen in a case where a user operation is received for displaying the first menu screen while the first menu screen is in a locked state, wherein the first menu screen is one of a plurality of menu screens;

setting the first menu screen to an unlocked state based on the password input by a user, wherein the first menu screen is displayed on the display unit in a state where the locked state is released; and setting the password for releasing the locked state of the first menu screen, wherein displaying is based on an instruction to display a second menu screen, the second menu screen in a state where the first menu screen is displayed, and, based on an instruction to display the first menu screen being received on the second menu screen displayed based on the instruction to display the second menu screen, displaying the first menu screen without displaying the screen regarding inputting the password, wherein the second menu screen is one of the plurality of menu screens and is different from the first menu screen, wherein, the first menu screen in the unlocked state is set to the locked state based on setting the password for releasing the locked state of the first menu screen.

11. A storage medium storing a program for causing a computer to function as each unit of the control apparatus according to claim 1.

* * * * *